US011694681B2

(12) United States Patent
Abdallah et al.

(10) Patent No.: US 11,694,681 B2
(45) Date of Patent: Jul. 4, 2023

(54) ARTIFICIAL ASSISTANT SYSTEM NOTIFICATIONS

(71) Applicant: eBay Inc., San Jose, CA (US)

(72) Inventors: Farah Abdallah, Seattle, WA (US); Joshua Benjamin Tanner, Seattle, WA (US); Jessica Erin Bullock, San Francisco, CA (US); Joel Joseph Chengottusseriyil, San Jose, CA (US); Jeff Steven White, San Jose, CA (US)

(73) Assignee: eBay Inc., San Jose, CA (US)

( * ) Notice: Subject to any disclaimer, the term of this patent is extended or adjusted under 35 U.S.C. 154(b) by 324 days.

(21) Appl. No.: 16/241,644

(22) Filed: Jan. 7, 2019

(65) Prior Publication Data

US 2019/0214005 A1    Jul. 11, 2019

Related U.S. Application Data

(60) Provisional application No. 62/614,889, filed on Jan. 8, 2018.

(51) Int. Cl.
*G10L 15/22* (2006.01)
*G06Q 30/02* (2023.01)
(Continued)

(52) U.S. Cl.
CPC ............ *G10L 15/22* (2013.01); *G06F 16/583* (2019.01); *G06F 16/9035* (2019.01);
(Continued)

(58) Field of Classification Search
CPC ... G10L 15/00; G10L 15/22; G10L 2015/225; G06Q 30/00; G06Q 10/10;
(Continued)

(56) References Cited

U.S. PATENT DOCUMENTS 8,566,143 B2    10/2013    Etzioni et al.
9,560,305 B2    1/2017    Bi et al.
(Continued)

FOREIGN PATENT DOCUMENTS

WO    2019/136387 A1    7/2019

OTHER PUBLICATIONS

International Preliminary Report on Patentability received for PCT Application No. PCT/US2019/012558, dated Jul. 23, 2020, 8 pages.
(Continued)

*Primary Examiner* — Sherief Badawi
*Assistant Examiner* — William P Bartlett
(74) *Attorney, Agent, or Firm* — FIG. 1 Patents

(57) ABSTRACT

Artificial assistant system notification techniques are described that overcome the challenges of conventional search techniques. In one example, a user profile is generated to describe aspects of products or services learned through natural language conversations between a user and an artificial assistant system. These aspects may include price as well as non-price aspects such as color, texture, material, and so forth. To learn the aspects, the artificial assistant system may leverage spoken utterances and text initiated by the user as well as learn the aspects from digital images output as part of the conversation. Once generated, the user profile is then usable by the artificial assistant system to assist in subsequent searches.

15 Claims, 10 Drawing Sheets

(51) Int. Cl.
*G06F 16/583* (2019.01)
*G06F 16/9038* (2019.01)
*H04L 67/306* (2022.01)
*G06F 16/9035* (2019.01)
*G06Q 10/10* (2023.01)
*H04L 65/40* (2022.01)
*H04L 67/50* (2022.01)
*G06Q 30/0283* (2023.01)
*G06Q 30/0202* (2023.01)
*G06Q 30/0251* (2023.01)
*G06Q 30/0282* (2023.01)
*G06Q 30/0201* (2023.01)

(52) U.S. Cl.
CPC ......... *G06F 16/9038* (2019.01); *G06Q 10/10* (2013.01); *G06Q 30/0201* (2013.01); *G06Q 30/0202* (2013.01); *G06Q 30/0251* (2013.01); *G06Q 30/0282* (2013.01); *G06Q 30/0283* (2013.01); *H04L 65/40* (2013.01); *H04L 67/306* (2013.01); *H04L 67/535* (2022.05); *G10L 2015/225* (2013.01)

(58) Field of Classification Search
CPC ........... G06Q 30/0201; G06Q 30/0202; G06Q 30/0251; G06Q 30/0282; G06Q 30/0283; G06N 3/00; G06F 16/583; G06F 16/9038; G06F 16/9035; H04L 29/08; H04L 67/22; H04L 67/306
See application file for complete search history.

(56) References Cited

U.S. PATENT DOCUMENTS

| | | | |
|---|---|---|---|
| 10,068,284 B1* | 9/2018 | Zisk | G06F 3/0482 |
| 2011/0218804 A1* | 9/2011 | Chun | G10L 15/144 |
| | | | 704/243 |
| 2012/0109781 A1* | 5/2012 | Felt | G06Q 30/0613 |
| | | | 705/26.41 |
| 2012/0316986 A1* | 12/2012 | Levy | G06Q 30/0631 |
| | | | 705/26.7 |
| 2013/0066721 A1 | 3/2013 | Berkowitz | |
| 2014/0100956 A1 | 4/2014 | Abileah et al. | |
| 2015/0100423 A1* | 4/2015 | Oldham | G06Q 30/0256 |
| | | | 705/14.54 |
| 2015/0185996 A1 | 7/2015 | Brown et al. | |
| 2016/0342317 A1 | 11/2016 | Lim et al. | |
| 2018/0025089 A1* | 1/2018 | Chin | G06F 16/9535 |
| | | | 707/706 |
| 2018/0137550 A1* | 5/2018 | Choi | G06Q 30/0256 |
| 2018/0150869 A1* | 5/2018 | Finnegan | G06Q 30/0239 |
| 2019/0158433 A1* | 5/2019 | Yun | G10L 15/26 |

OTHER PUBLICATIONS

International Search Report for PCT Application No. PCT/US2019/012558, dated Apr. 16, 2019, 5 pages.
International Written Opinion for PCT Application No. PCT/US2019/012558, dated Apr. 16, 2019, 6 pages.

* cited by examiner

ARTIFICIAL ASSISTANT SYSTEM NOTIFICATIONS

RELATED APPLICATIONS

This Application claims priority under 35 U.S.C. § 119(e) to U.S. Provisional Patent Application 62/614,899, filed Jan. 8, 2018, and titled "Artificial Assistant System Notifications," the entire disclosure of which is hereby incorporated by reference.

BACKGROUND

Search is one of the primary techniques, via which, users of computing devices may locate information of interest. Users, for instance, may enter search queries to find digital content such as digital images, video, music, locate products or services, and so on. This is typically performed as a keyword search in which a user expresses a goal of the search to the best of their ability using text. This text is then matched to items of digital content that are tagged using similar keywords.

Conventional search techniques, however, are typically repetitive and as a result may involve performance of repeated user interactions. A user, for instance, may initiate a search by a computing device for an item of interest. If that item is not found, the user is then forced to manually repeat the search. This may be due to unavailability of the item of interest or due to a disconnect between how a goal of a search is expressed by a user using text and how the item of interest is tagged. Forced repetition as part of these conventional systems may thus hinder operation of the computing devices that implement the search functionality and result in user frustration.

SUMMARY

Artificial assistant system notification techniques are described that overcome the challenges of conventional search techniques. In one example, a user profile is generated to describe aspects of products or services learned through natural language conversations between a user and an artificial assistant system. These aspects may include price as well as non-price aspects such as color, texture, material, and so forth. To learn the aspects, the artificial assistant system may leverage spoken utterances and text initiated by the user as well as learn the aspects from digital images output as part of the conversation, e.g., to learn colors, objects, and so on in digital images output by the artificial assistant system. The artificial assistant system may also learn values for these aspects over time that resulted in successful conversion of a product or service, e.g., to learn that a five percent discount is not interesting to a user but a ten percent discount did result in conversion.

Once generated, the user profile is then usable by the artificial assistant system to assist in subsequent searches. The artificial assistant system, for instance, may detect user interest in a product or service as part of a natural language conversation. The artificial assistant system may then determine whether a triggering event has occurred with respect to that product or service (e.g., a product or service is available as having the aspect) based on the user profile, and if so, output a notification. In this way, the artificial assistant system may avoid the repeated manual searches of conventional techniques and also address limitations of an ability of a user to express a goal of a search through use of aspects learned from digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
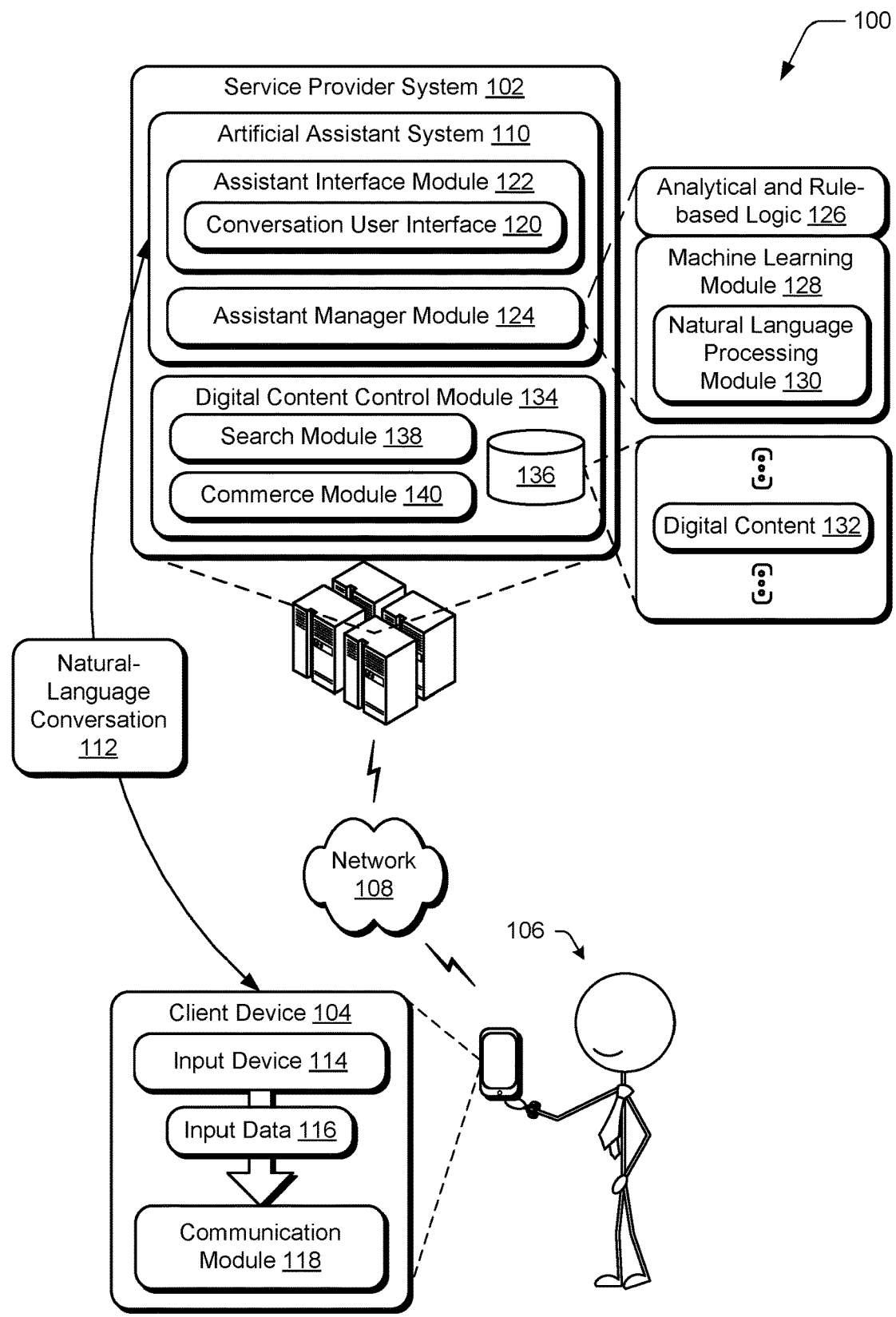
FIG. 1 is an illustration of an environment in an example implementation that is operable to employ artificial assistant system notification techniques described herein.

Conventional search techniques may involve repeated attempts to locate a desired product or service due to unavailability of the item of interest. This may also be due to a disconnect between how a goal of a search is expressed by a user using text and how the item of interest is tagged in order to locate the item. This results in computational inefficiency as well as user frustration.

Accordingly, artificial assistant system notification techniques are described in which aspects of products or services learned through natural language conversations between a user and an artificial assistant system are used to generate a user profile. The user profile may then be leveraged in a variety of ways, such as to determine whether the aspect has been met by a product or service at a later point in time, automatically supplement subsequent searches, and so on. As a result, the artificial assistant system may support increased richness in searches of products and services with increased computational efficiency.

In one example, the artificial assistant system detects user interest in a product or service. This may be detected in a variety of ways, such as whether a user "favorited" an item, as part of a natural language conversation, a search for the item, and so forth. A user, for instance, may engage in a natural language conversation with the artificial assistant system as part of an unsuccessful search to locate a product or service of interest. A user profile is generated by the artificial assistant system that identifies the user, the item, and an aspect of the product or service, which may include price and non-price aspects such as color, material, size, and so forth.

The artificial assistant system then detects occurrence of a triggering event, which may be scheduled or based on the aspect itself such as a change in price a change availability of the non-price aspect, and so forth. In response, a search query is generated by the artificial assistant system automatically and without user intervention and a search result received in response to the search query. Digital images may also be leveraged, whether as part of the search query and/or to learn non-price aspects that are desired by the user, e.g., particular colors, textures, patterns, materials and so on. The artificial assistant system then determines whether the aspect is met, e.g., a price decrease by at least a threshold amount, availability of a particular color, size, and so forth. If so, the artificial assistant system outputs a notification indicating so to the user. In this way, the artificial assistant system may take proactive actions on the part of the user "in the background" to locate products or services of interest.

The user profile may also be leveraged by the artificial assistant system to learn the aspects and values for the aspects over time. The artificial assistant system, for instance, may learn an amount of a discount that causes a user to purchase a product or service. This may also include non-price aspects, such as colors and so forth. These aspects may then be leveraged to supplement future searches. For example, the artificial assistant system may detect user interest in a product or service as before, e.g., as a result of an unsuccessful search. The artificial assistant system may then use an aspect learned in previous natural language conversations and maintained in a user profile to perform additional searches in the background to see if that aspect has been met and if so output a notification. A user, for instance, may search for running shoes but does not locate a running shoe of interest. The artificial assistant system may perform additional searches in the background, and as part of this also leverage the user profile to locate a particular shade of blue learned from previous successful conversions on the part of the user. As a result, a notification output by the artificial assistant system has an increased likelihood of being accurate and relevant to the user. Further discussion of these and other examples is included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ artificial assistant system notification techniques described herein. The illustrated environment 100 includes a service provider system 102 and a client device 104 of a user 106 that are communicatively coupled, one to another, via a network 108. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated for the client device 104), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as illustrated for the service provider system 102 and as described in relation to FIG. 8.

The service provider system 102 in this example includes an artificial assistant system 110 that is configured to engage in a natural-language conversation 112 with a user 106 of the client device 104. The client device 104, for instance, may include an input device 114 that is usable to generate input data 116, e.g., text via a keyboard, a spoken utterance that is converted to text, capture of a digital image, and so forth. The input data 116 is then communicated by a communication module 118 (e.g., browser, network-enabled application) via the network 108 to a conversation user interface 120 of the artificial assistant system 110.

Figure 2A:
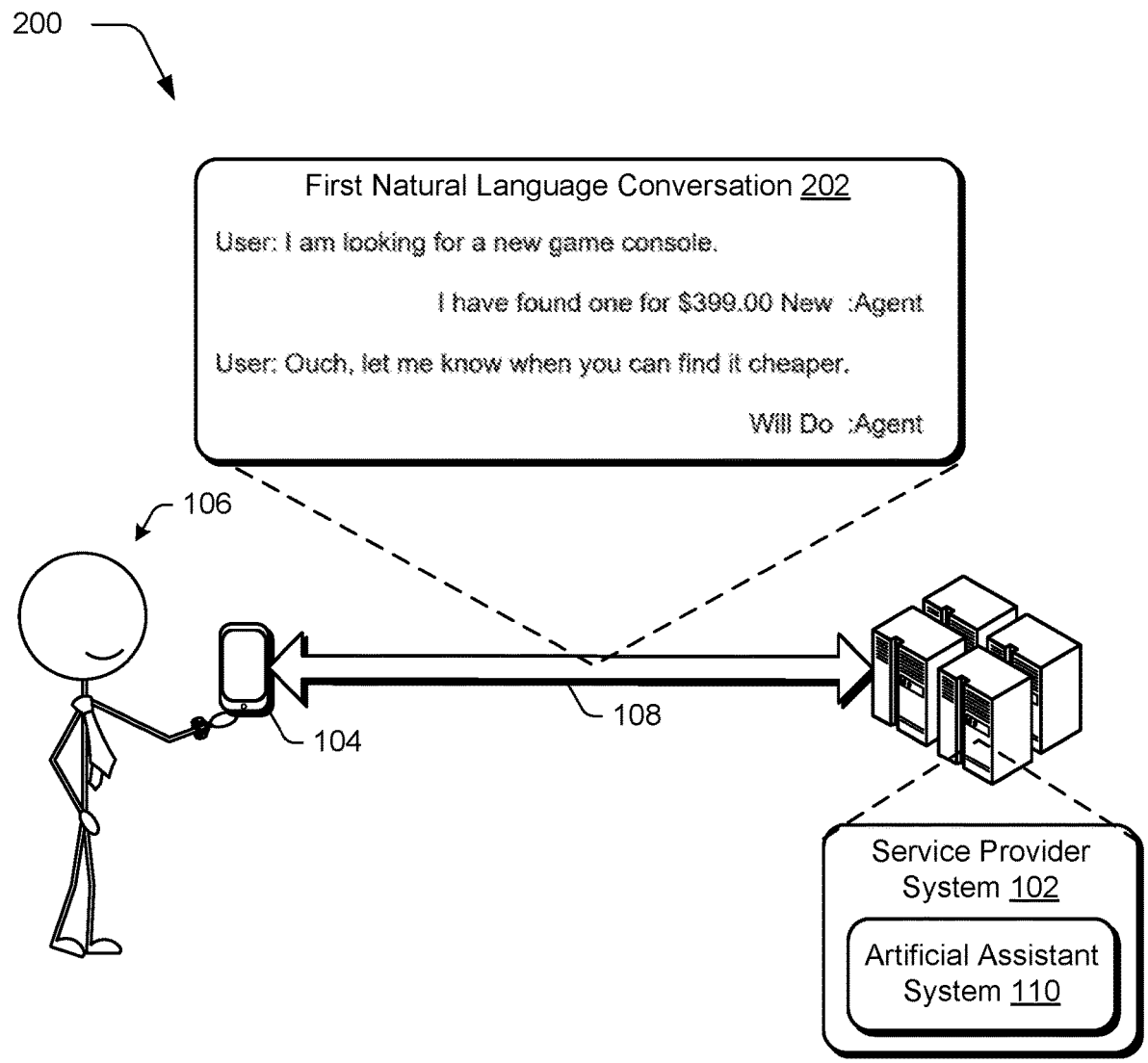
FIGS. 2A-2C depicts an example of a natural-language conversation and notifications regarding a change in an aspect of a search.
Figure 2B:
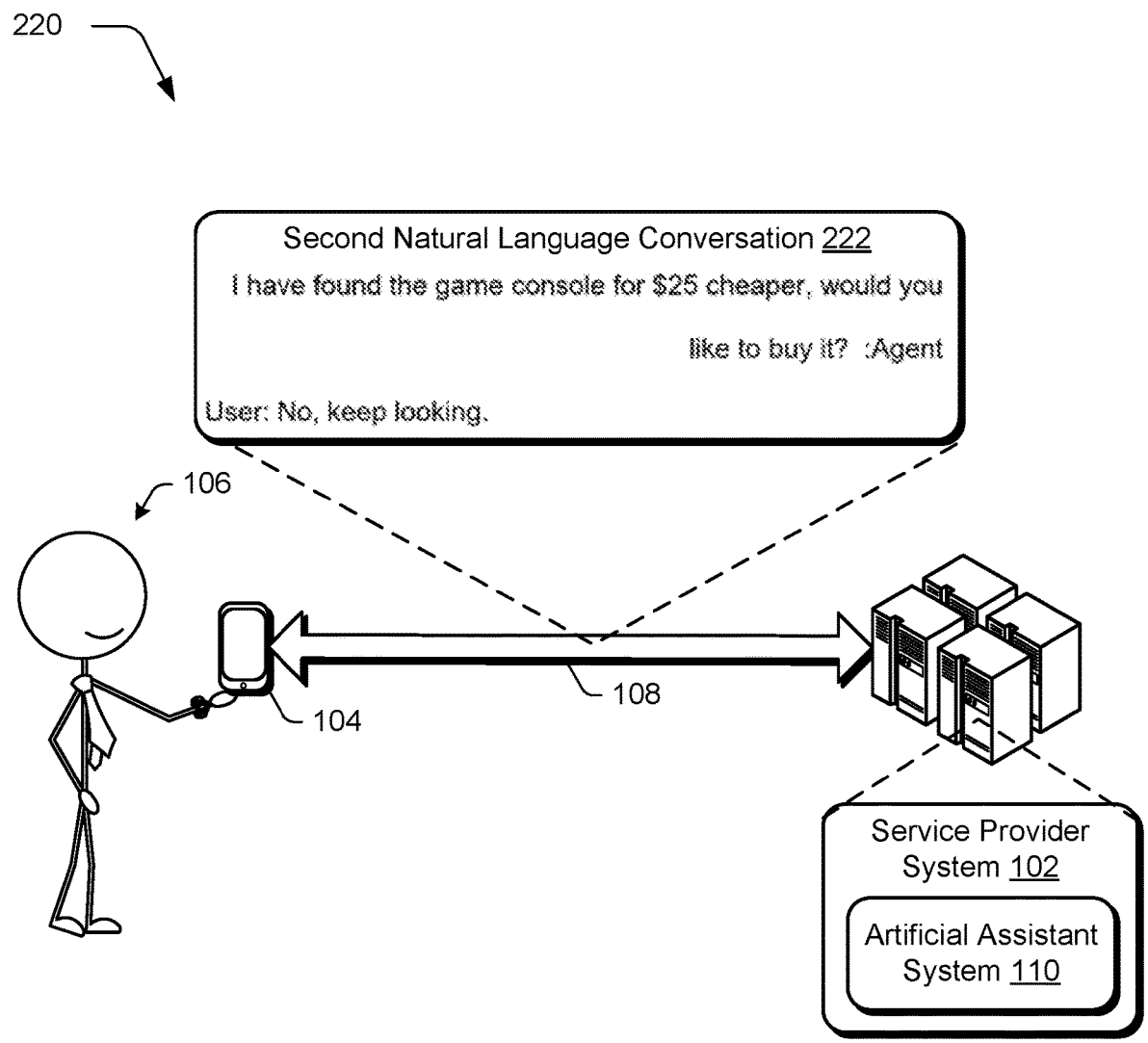
Figure 2C:
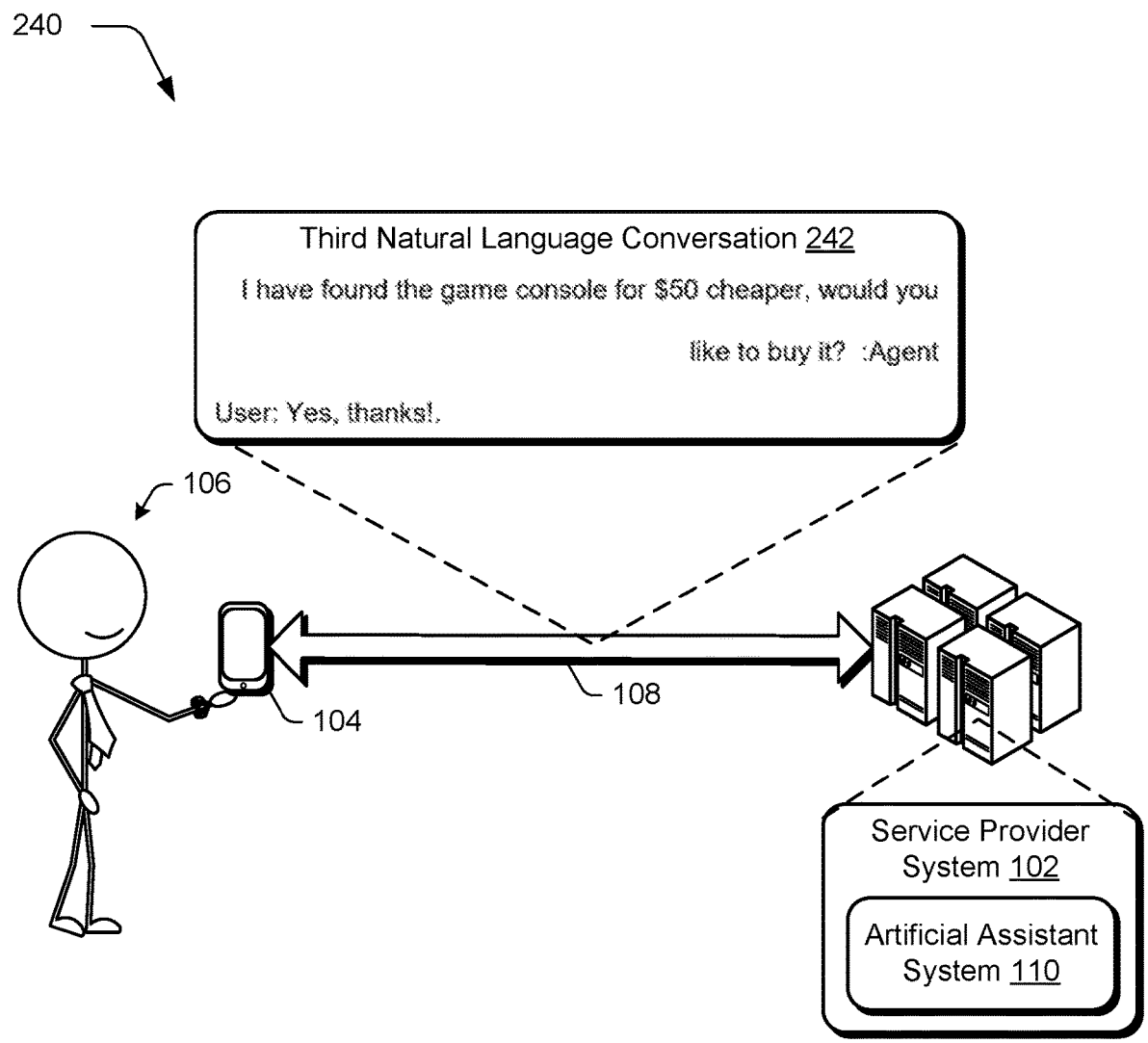

The conversation user interface 120, for instance, may be configured by an assistant interface module 122 and assistant manager module 124 to implement a chatbot, also known as an interactive agent or artificial conversational entity. The chatbot is configured to virtually simulate a conversational partner to a user 106 of the client device 104 as part of a dialog system to implement the natural-language conversation 112. The assistant manager module 124, for instance, may participate as part of the natural-language conversation 112 by generating communications as part of a "back-and-forth" with the user 106 of the client device 104 as shown in FIGS. 2A-2C. This may be employed in a variety of different scenarios, such as customer service, information acquisition, digital commerce, and so forth.

To generate the communications, the assistant manager module 124 may employ a variety of functionality. In one example, analytics and rule-based logic 126 are employed, such as to parse the natural-language conversation 112 for keywords and to locate pre-configured replies based on the keywords. In another example, a machine-learning module 128 is employed that includes a natural-language processing module 130. The machine-learning module 128, for instance, may employ a model that is a computer representation that can be tuned (e.g., trained) based on inputs to approximate unknown functions.

In particular, the model and machine-learning module 128 may employ computer functionality to learn from, and make predictions on, known data by analyzing the known data to learn to generate outputs that reflect patterns and attributes of the known data. Examples of machine learning include decision trees, support vector machines, linear regression, logistic regression, Bayesian networks, random forest learning, dimensionality reduction algorithms, boosting algorithms, artificial neural networks, deep learning, and so forth. Thus, machine learning and a machine learning model are used to make high-level abstractions in data by generating data-driven predictions or decisions from the known input data.

Natural-language processing as implemented by the natural-language processing module 130 is configured to incorporate speech recognition, natural-language understanding, and natural-language generation. This is used to understand communications received from the client device 104 as part of the natural-language conversation 112 as well as to generate communications to the client device 104. The natural-language processing module 130, for instance, may employ a neural network to generate a representation of a communication from the client device 104, and from this, understand "what is being said" as well as to generate an appropriate response, if any. This may be used for a variety of purposes.

In the illustrated example, the artificial assistant system 110 is configured to help control output of digital content 132 by the digital content control module 134 to the client device 104, which is illustrated as stored in a storage device 136. The digital content 132, for instance, may be configured as recommendations, digital marketing content configured to cause conversion of a product or service, streaming digital media, digital music, search results, and so forth. Examples of this are utilized in search by a search module 138, such as to locate a particular item of interest (e.g., a particular product or service), generate a search result, and so forth. A commerce module 140, for instance, may be configured to receive bids for particular goods or services. Therefore, to locate an item of interest the search module 138 receives a search query from the artificial assistant system 110 and provides digital content 132 as a result of the search, e.g., identifying a particular item of interest.

As previously described, conventional search techniques may involve significant amounts of repetition. Accordingly, techniques described herein are configured to reduce this repetition, and thus promote efficiency consumption of computational resources as part of performing a search. Examples 200, 220, 240 of this are illustrated in FIGS. 2A, 2B, and 2C.

As depicting in the example 200 of FIG. 2A, a first natural language conversation 202 occurs between a user 106 of a client device 104 and the artificial assistant system 110 of the service provider system 102, which may also be implemented locally by the client device 104. In this conversation, the user 106 initiates a search query for a new game console and the artificial assistant system 110 provides a search result. A user 106 then provides an input indicating that an aspect of the search result is not satisfactory, e.g., price in this example. This may be understood by the artificial assistant system 110 through natural language processing and natural language understanding techniques, by noting that the product or service was not purchased, and so forth. Other non-price aspects are also contemplated, such as any characteristic of a product or service such as color, texture, material, size, pattern, style, and so forth.

From this, the artificial assistant system 110 is configured to generate a user profile based on the user's expressed interest in a product or service that is subject to digital content retrieved as part of the search result as well as the identified aspect that is deemed unsatisfactory, e.g., price, size, color, texture, material, and so forth. The artificial assistant system 110 is then configured to repeat the search automatically and without user intervention based on a triggering event. A triggering event may be scheduled and/or based on a change to the aspect, e.g., price.

As shown in the example 220 of FIG. 2B, for instance, a second natural language conversation 222 is initiated by the artificial assistant system 110 which include a notification of the change in the aspect, e.g., a drop-in price. In this instance, however, that change has not been deemed satisfactory by the user 106. Accordingly, as shown in the example 240 of FIG. 2C, a third natural language conversation 242 is initiated by the artificial assistant system 110 indicative of a further change to the aspect. The user 106 in this instance deems this change agreeable, and in response provides an input to initiate purchase of the product or service. In this way, the artificial assistant system 110 may continue to operate "in the background" to initiate searches automatically and without user intervention.

Figure 3:
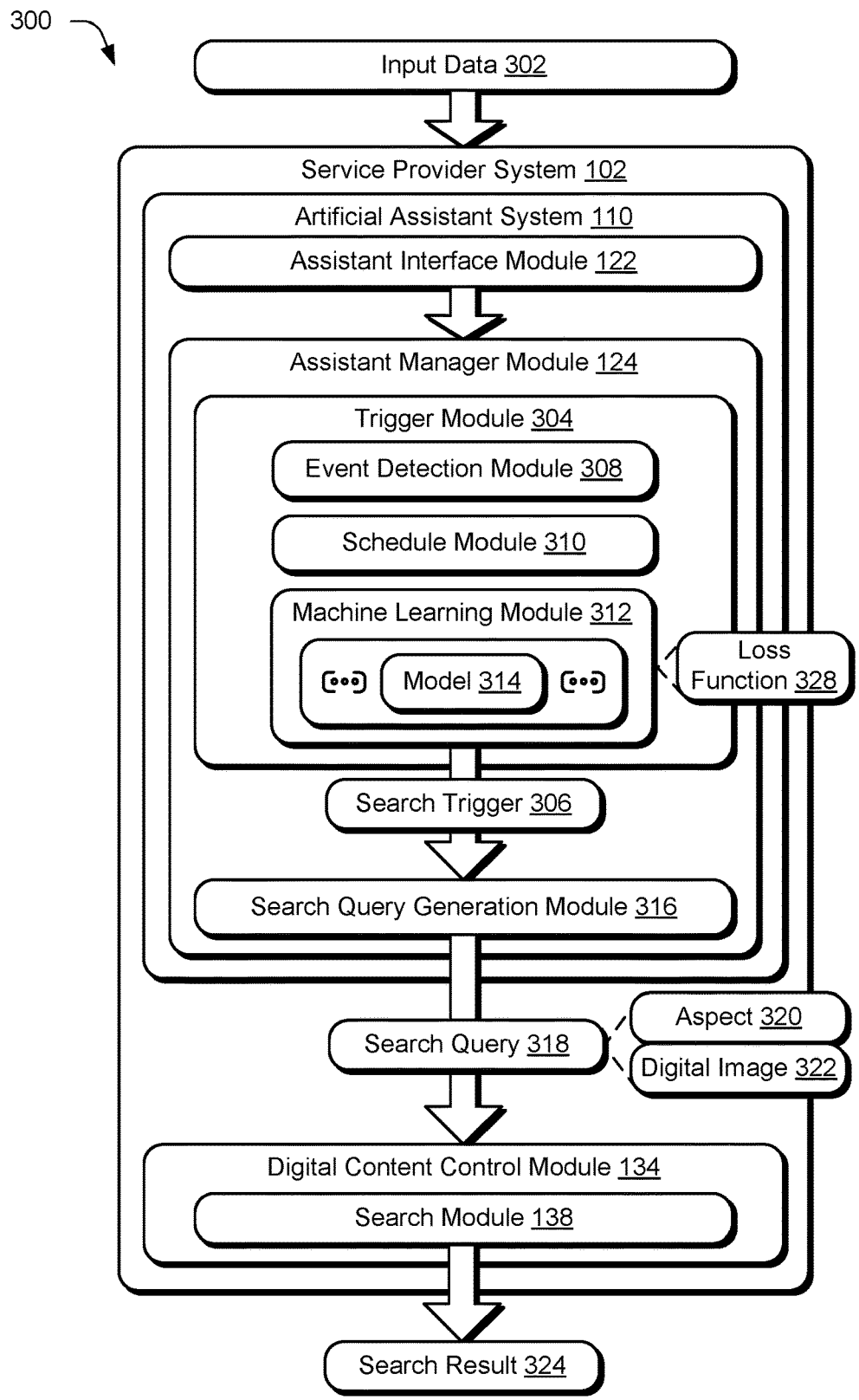
FIGS. 3-4 depict an example showing operation of an artificial assistant system of FIG. 1 in greater detail as supporting notification techniques described herein.
Figure 4:
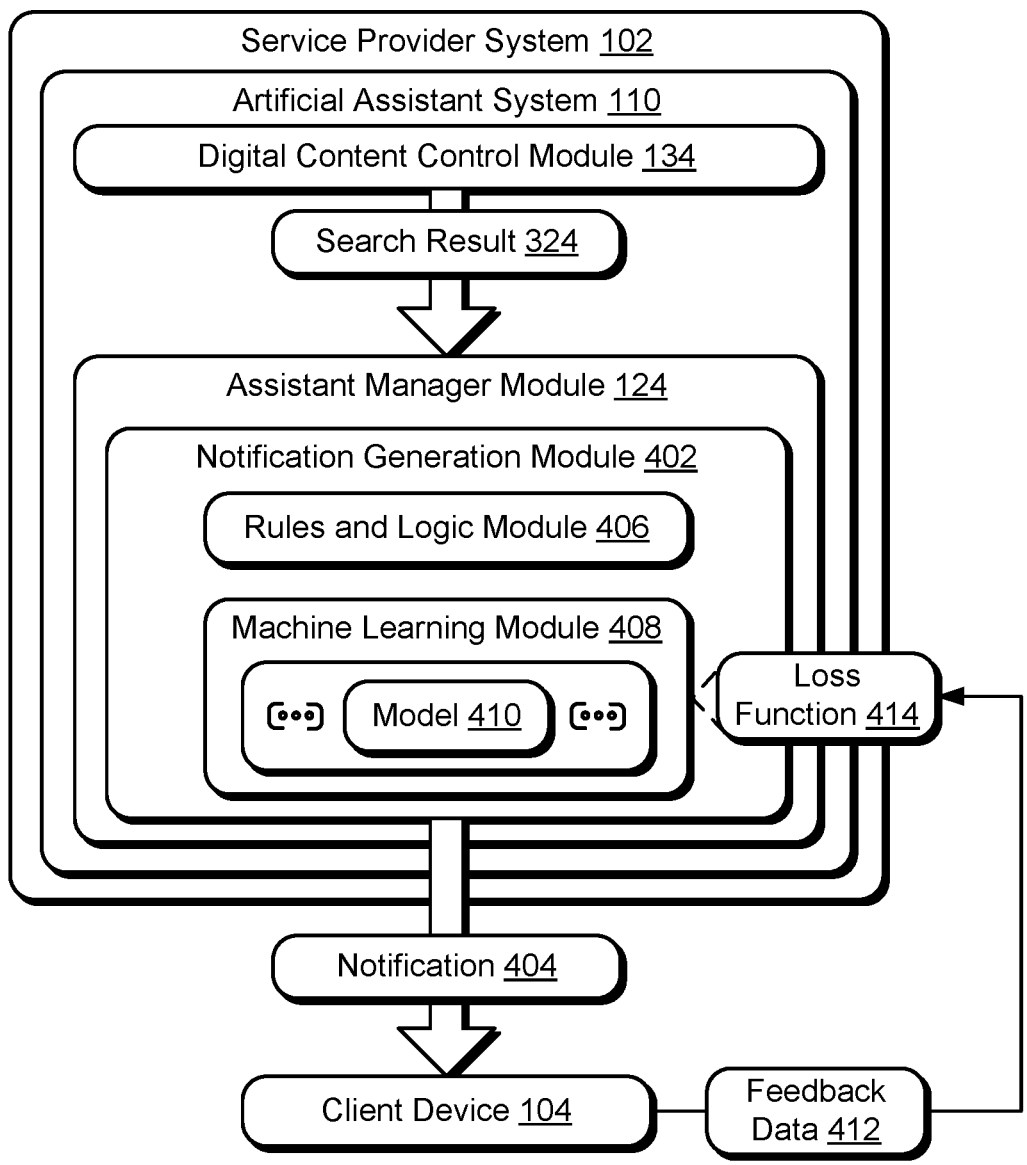

Further, the artificial assistant system 110 may be configured to learn preferences of the user 106 over time (e.g., as part of machine learning or rules and logic) with respect to these aspects (e.g., particular values for the aspects), a system to do which is illustrated with respect to FIGS. 3 and 4. In the previous example, the artificial assistant system 110 may determine an amount of a change in the aspect that is deemed desirable by the user 106, e.g., a dollar amount or percentage. This may then be employed by the artificial assistant system 110 in the future to control output of subsequent notifications regarding changes to these aspects.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 5:
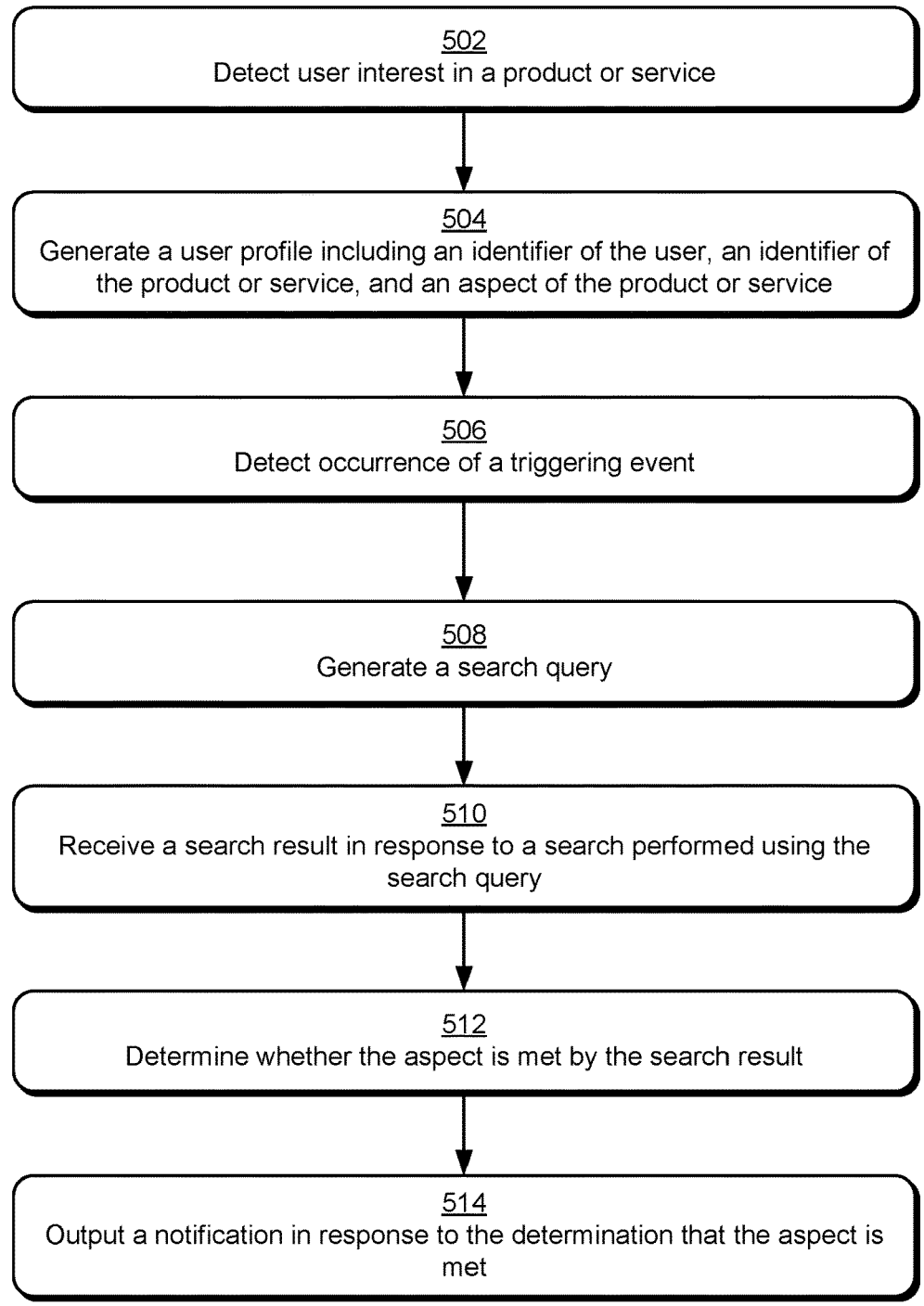
FIG. 5 is a flow diagram depicting a procedure in an example implementation in which a user profile is generated and used as part of artificial assistant system notifications.

FIG. 5 depicts a procedure 500 in an example implementation of artificial assistant system notifications. To begin in this example, user interest in a product or service (block 502) is detected by a computing device. A user input, for instance, may be received via a user interface in which a user has selected an option to indicate a favorable impression of the product or service, e.g., has "favorited" the product or service. This may also be performed based on digital images communicated as part of the natural language conversation. For example, digital image processing techniques may be used to determine aspects of products or services that resulted in conversion and values of those aspects, e.g., colors, materials, patterns, objects, and so on. In another example, rules-based logic and/or machine learning is employed to monitor this user interaction, e.g., navigation to digital content (e.g., webpages) pertaining to particular products or services, repeated mention in a natural language conversation, purchase history, and/or other monitored user interaction with digital content.

From this, a user profile is generated by the computing device that includes an identifier of the user (e.g., user ID), an identifier of the product or service (e.g., product ID), and an aspect of the product or service (block 504), e.g., an aspect that was not "met" as previously described such as price, color, and so on. In one example, the aspect is stored automatically as a current price of the product or service as indicated by digital content received as part of a previous search result.

The computing device then detects occurrence of a triggering event (block 506). The triggering event, for instance, may be scheduled to occur at particular intervals of time, e.g., hourly, daily, weekly, monthly, quarterly, etc. In another example, the triggering event is defined based on a detected change to an aspect, e.g., "price" to find a better deal, availability of non-price aspects such as color, material, size, and so forth.

In response to this detected occurrence, a search query is generated by the computing device (block 508). Continuing with the previous example, a user may have "favorited" digital content that describes a product or service. A digital image included as part of this digital content is then used as part of the search query, which may also include characteristics of the product or service learned from the digital image, i.e., the aspects. Object recognition, for instance, may be performed by the computing device to determine what object is included in the digital image as well as aspects (e.g., characteristics) of the object, e.g., color, texture, size, and so forth. Thus, the digital image may provide additional information usable to increase accuracy of a search for aspects that may be difficult if not impossible for the user 106 to express using text, e.g., to describe a pattern.

A search result is then received in response to a search performed using the search query (block 510), e.g., using the digital image and accompanying data such as aspects learned from the image, text entered by the user, and so forth. This search may be performed remotely by a service provider system 102 and/or locally by the client device 104. The search result includes digital content that results from the search, e.g., pictures, product or service listings, digital images, and so forth.

A determination is then made by the computing device as to whether the aspect is met by the search result (block 512). For a price aspect, for instance, this may involve determining if the product or service is available for less. This may also be based on machine learning to determine a likelihood that this change is of a sufficient amount "to make a difference" to the user, e.g., by learning an amount of a price drop that will cause the user 106 to purchase a product or service. Based on this, a notification is output in response to the determination that the aspect is met (block 514). The notification may be output in a variety of ways, such as by initiating another natural language conversation as shown in FIGS. 2A-2C, a message (e.g., instance message, text, email), served as digital marketing content to the user (e.g., a banner ad for output in a browser of mobile application), and/or as augmented or virtual reality content as further described in the following.

Figure 6:
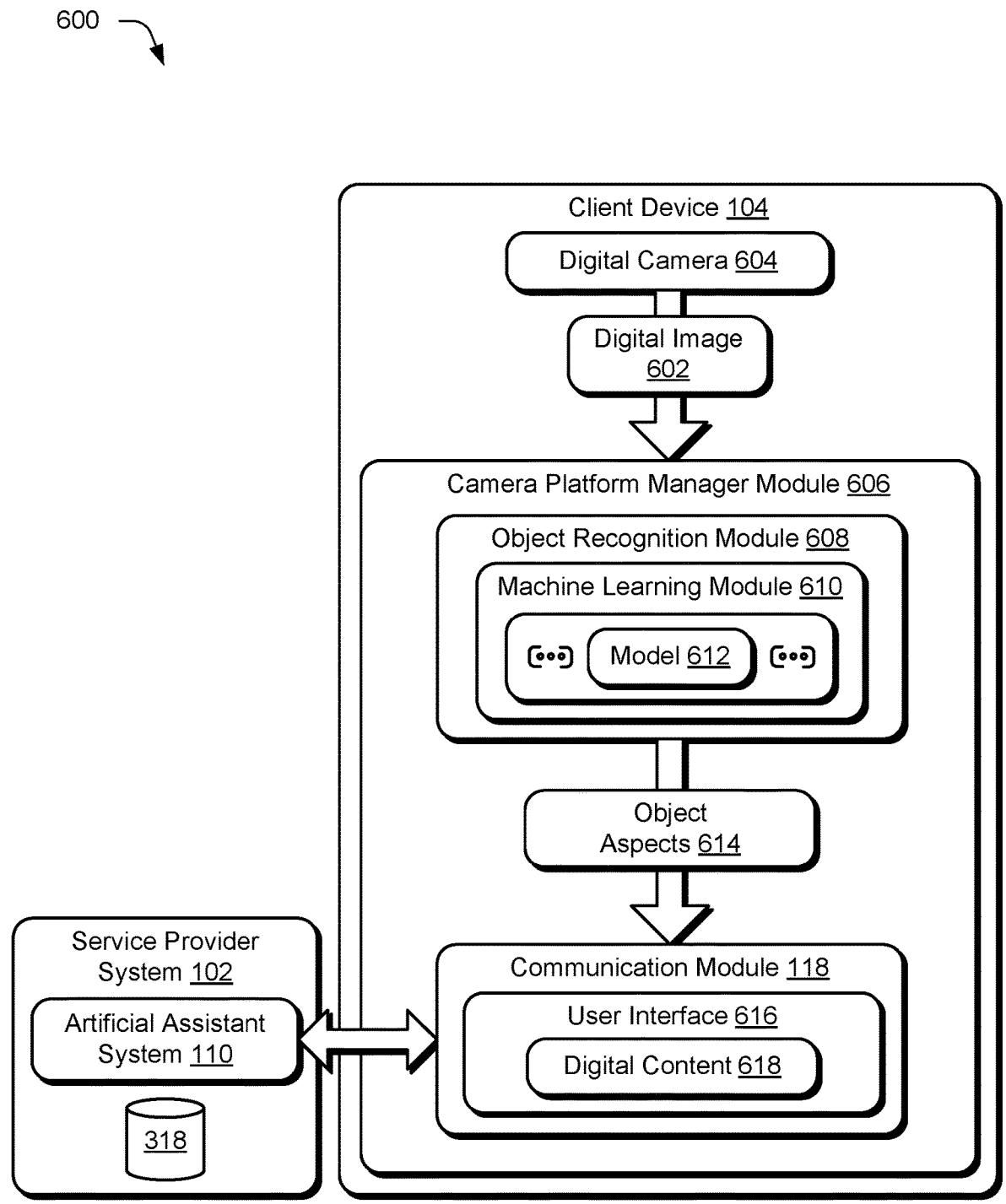
FIG. 6 depicts an example of a real time camera platform usable to incorporate the artificial assistant system notification techniques described herein.

FIG. 6 depicts an example system 600 a real time camera platform as incorporating notification techniques. To begin, a digital image 602 is obtained by digital camera 604 of a camera platform manager module 606. The digital image 602, for instance, may be captured using a digital camera, as a screenshot captured from a frame buffer of a computing device, and so forth. This may be performed, for instance, as part of a natural language conversation to supplement spoken utterances of the user 106, as part of an initial search query, and so forth.

The digital image 602 is then processed by an object recognition module 608 to recognize object aspects 614 exemplified by the digital image 602. The object recognition module 608, for instance, may employ a machine learning module 610 configured to employ models 612 usable to recognize the object and aspects of the object using machine learning, e.g., neural networks, convolutional neural networks, deep learning networks, structured vector machines, decision trees, and so forth.

The models 612, for instance, may be trained using training digital images that are tagged with corresponding identifications. In an implementation, these training digital images and tags are obtained from a commerce service provider system that are tagged by sellers using the system. As a result, a multitude of accurately tagged training digital images may be obtained with minimal computation and user cost as opposed to conventional manual tagging techniques. In this way, the models 612 may be configured to recognize aspects of objects that are usable to configure the user model to initiate search queries as described above. Although illustrated as implemented locally by the client device 104, this functionality may also be implemented in whole or in part by a service provider system 102 via the network 108.

The object aspects 614 and digital image 602 are then communicated to the service provider system 102. The service provider system 102 then uses the data as input data to perform a search, e.g., generate a search query and initiate a search. A result of the search performed based on the search query may then be output in real time in a user interface, e.g., as augmented or virtual reality content within a "live stream" of digital images captured in an environment of the client device 104.

The AR digital content, for instance, may include a name and price (e.g., average price, price for sale, price to buy, etc.) of object available via an electronic commerce system. The AR digital content, as rendered, is configured to remain "as is" relative to the view of the object, e.g., based on data received from orientation sensors such as accelerometers, inertial devices, gravitometers, image processing and feature recognition from the digital images, and so forth. The AR digital content, for instance, may indicate availability of a product or service that meets the aspect that was not previously met in an unsuccessful search.

The AR digital content also includes information regarding the same or similar goods that are available for purchase from the service provider system 102, e.g., as part of an online auction, for a set price, etc. In this way, the camera platform manager module 606 implements the camera platform as non-modal within a user interface such that a user remains within a context of a real time "live" feed of digital images and yet still is able to obtain metadata describing objects included in those digital images. The user 106, for instance, may "look around" at different objects within a living room and readily determine how to buy or sell these objects based on real time information obtained from the service provider system 102. The user may also be made aware, via notifications output as AR digital content, of availability of products or services that meet aspects that were not previously met in previous searches. In this way, the artificial assistant system may expand functionality available to a user with increased computational efficiency over conventional techniques that require manual search repetition.

Figure 7:
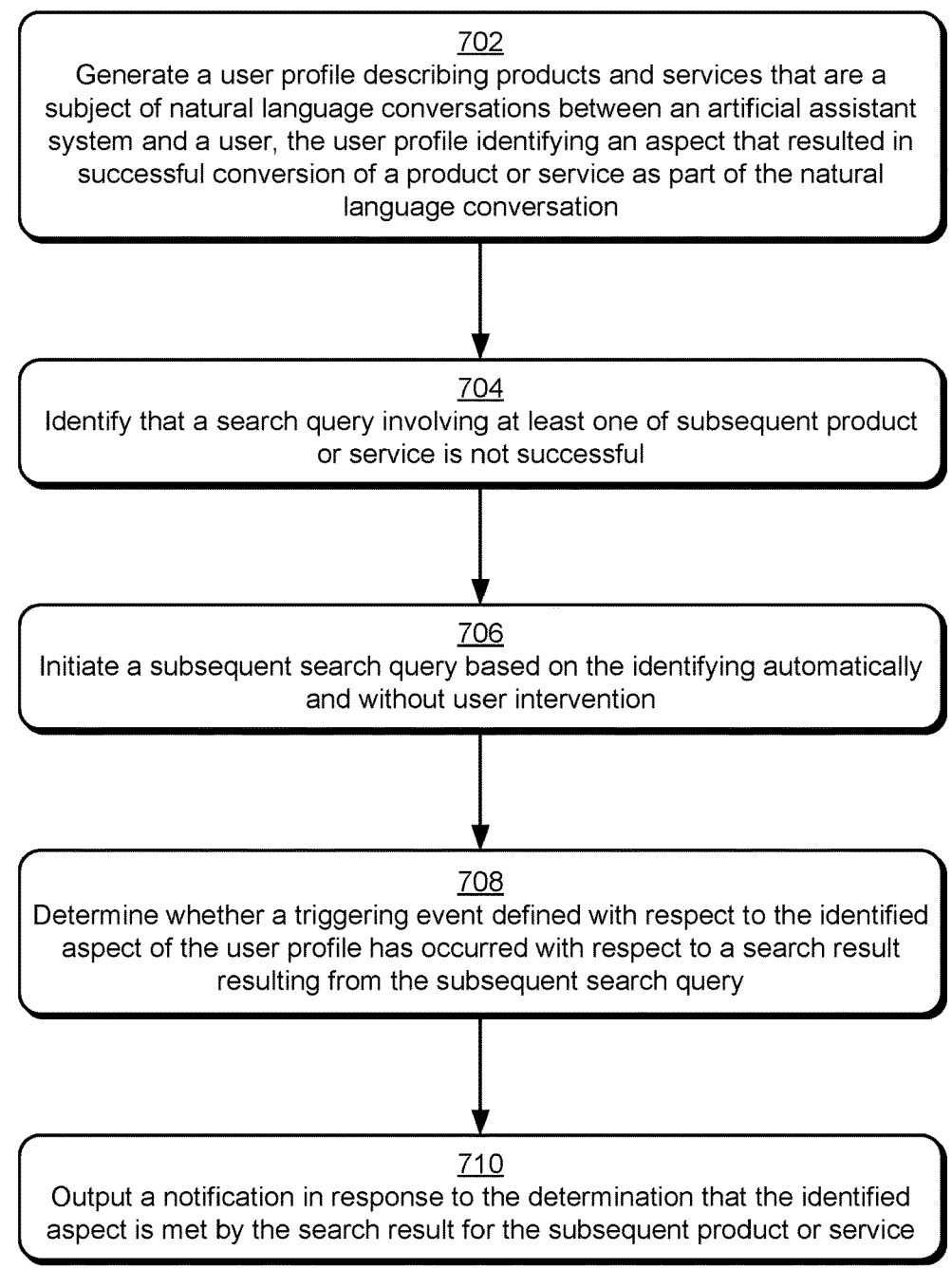
FIG. 7 depicts a procedure in an example implementation in which a user profile is used to include additional aspects in a search to increase a likelihood of looking a product or service of interest.

FIG. 7 depicts a procedure 700 in an example implementation in which a user profile is used to include additional aspects in a search to increase a likelihood of looking a product or service of interest. A user profile is generated that describes products and services that are a subject of natural language conversations between an artificial assistant system and a user. The user profile identifies an aspect that resulted in successful conversion of a product or service as part of the natural language conversation (block 702). A user as illustrated in FIGS. 2A-2C, for instance, may engage in repeated conversations with the artificial assistant system. These conversations may include spoken utterances, text inputs, and digital images as part of a back-and-forth conversation.

A user, for instance, may engage in several natural language conversations. These conversations may involve different products and services and corresponding aspects, such as colors, discounts, materials, price, and so forth. Over time, the user profile is generated to "learn" which aspects results in successful conversion of a corresponding product or service, which may then be used to assist further searches. This may include analysis of text used as part of the natural language conversation (e.g., converted via spoken utterance) as part of natural language understanding, and may also leverage digital images used as part of the conversation. A user, for instance, may initiate a search for "blue shoes." Digital image processing techniques may then be used to determine which shade of blue in a digital image resulted in successful conversion, e.g., purchase of the shoes. This aspect may then be added to the user profile to assist future searches.

The artificial assistant system, for instance, may identify a search query involving at least one subsequent product or service is not successful (block 704), e.g., to purchase gloves. A subsequent search query is then initiated by the artificial assistant system automatically and without user intervention for the subsequent product or service (block 706), e.g., after a predefined amount of time. A determination is then made as to whether a triggering event defined with respect to the identified aspect of the user profile has occurred with respect to a search result resulting from the subsequent search query (block 708). The artificial assistant system, for instance, may determine whether aspects specified by the user profile are met by the search result, e.g., a shade of blue that was not met in the unsuccessful search query. In this way, the artificial assistant system may locate products of services that may be of interest to a user from the unsuccessful searches, even if those aspects are not included in the original unsuccessful search. In an implementation, the subsequent search query includes this aspect from the user profile to increase a likelihood of inclusion of this aspect. A variety of other examples are also contemplated.

Example System and Device

Figure 8:
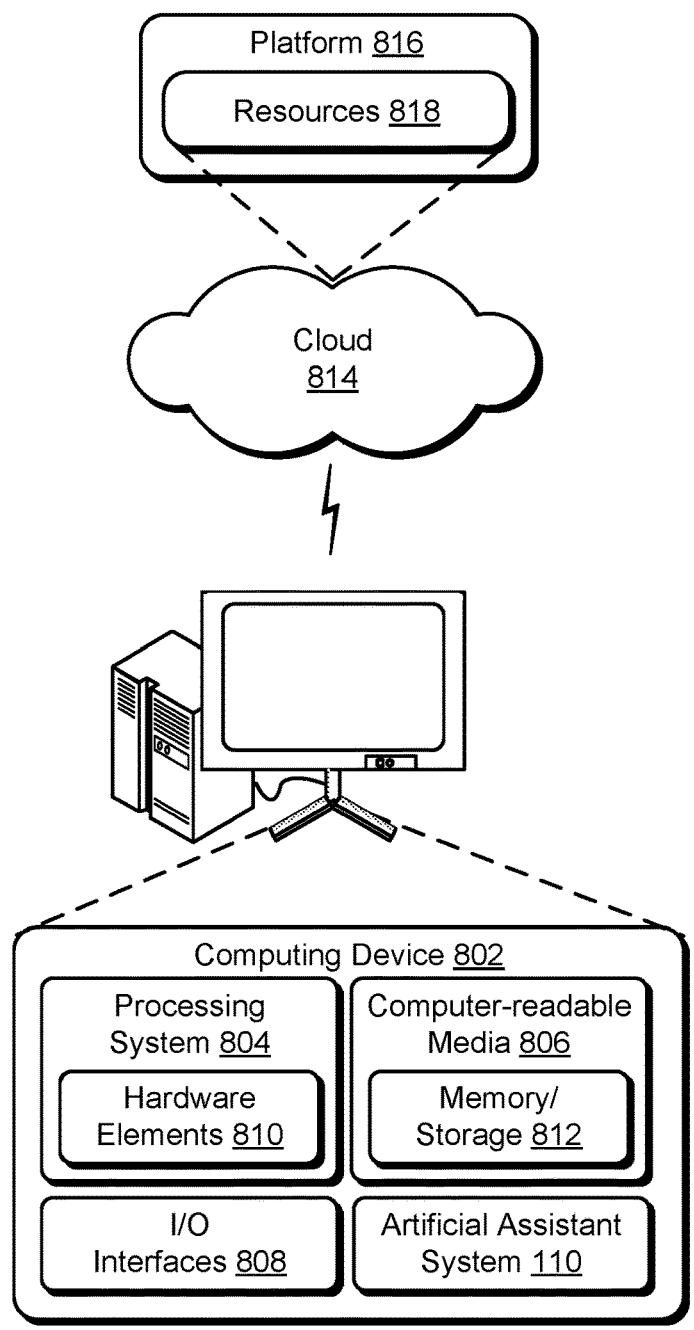
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the artificial assistant system 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    generating, by the computing device, a user profile including an aspect model trained using machine learning based on initial natural language conversations between an artificial assistant system of the computing device and a user, the user profile identifying a first value of an aspect that resulted in successful conversion of a first product or service as part of the initial natural language conversations;
    identifying, by the computing device, a second value of the aspect that resulted in unsuccessful conversion of a second product or service as part of a subsequent natural language conversation;
    learning, automatically and without user intervention by the computing device, a first threshold value of the aspect using the aspect model trained using machine learning based on the first value and the second value of the aspect;
    receiving, by the computing device, an indication of a third value of the aspect that resulted in unsuccessful conversion of a third product or service;
    learning, automatically and without user intervention by the computing device, a second threshold value of the aspect using the aspect model trained using machine learning based on the third value of the aspect;
    initiation, by the computing device, a search query including the aspect;
    repeating, in a background of the computing device for the user, one or more searches automatically and without user intervention using the search query until a comparison of a value of the aspect of a search result of the repeated one or more searchs and the second threshold value of the aspect; and
    outputting, by the artificial system of the computing device, a notification responsive to the determination that the triggering event has occurred.

2. The method implemented by the computing device as described in claim 1, wherein the aspect is a non-price aspect, the non-price aspect including color, size, pattern, style, or material.

3. The method implemented by the computing device as described in claim 2, wherein the non-price aspect is identified from a digital image output by the artificial assistant system of the computing device as part of the initial natural languarge conversations.

4. The method implemented by the computing device as described in claim 3, wherein the search query including the aspect further includes a different product or service.

5. The method implemented by the computing device as described in claim 1, wherein the aspect is a price and the second threshold value of the aspect is a threshold change in the price.

6. A computing device comprising:
a processing system; and
a memory to store instructions which, responsive to execution by the processing system, cause the processing system to implement an artificial assistant system to perform operations including:
generating a user profile including an aspect model trained using machine learning based on initial natural language conversations between an artificial assistant system of the computing device and a user, the user profile identifying a first value of an aspect that resulted in successful conversion of a first product or service as part of the initial natural language conversation;
identifying a second value of the aspect that resulted in unsuccessful conversion of a second product or service as part of a subsequent natural language conversation;
learning, automatically and without user intervention, a first threshold value of the aspect using the aspect model trained using machine learning based on the first value and the second value of the aspect;
receiving an indication of a third value of the aspect that resulted in unsuccessful conversation of a third product or service;
learning, automatically and without user intervention, a second threshold value of the aspect using the aspect model trained using machine learning based on the third value of the aspect;
initiating a search query including the aspect;
repeating, in a background of the computing device for the user, one or more searches automatically and without user intervention using the search query until a comparison of a value of the aspect of a search result of the repeated one or more searches and the second threshold value of the aspect; and
outputting, by the artificial assistant system, a notification responsive to the determination that the triggering event has occurred.

7. The computing device as described in claim 6, wherein the aspect is a non-price aspect, the non-price aspect including color, size, pattern, style, or material.

8. The computing device as descrbed in claim 7, wherein the non-price aspect is identified from a digital image output by the artificial assistant system of the computing device as part of the initial natural language conversations.

9. The computing device as described in claim 6, wherein the search query including the aspect further includes a different product or service.

10. The computing device as described in claim 6, wherein the aspect is a price and the second threshold value of the aspect is a threshold change in the price.

11. One or more non-transitory computer readable storage media storing instructions that, responsive to execution by a processing system, cause the processing system to implement an artificial assistant system to perform operations including:
generating a user profile including an aspect model trained using machine learning based on initial natural language conversations between an artificial assistant system and a user, the user profile identifying a first value of an aspect that resulted in successful conversion of a first product or service as part of the initial natural language conversations;
identifying a second value of the aspect that resulted in unsuccessful conversion of a second product or service as part of a subsequent natural language conversation;
learning, automatically and without user intervention, a first threshold value of the aspect using the aspect model trained using machine learning based on the first value and the second value of the aspect;
receiving an indication of a third value of the aspect that resulted in unsuccessful conversation of a third product or service;
learning, automatically and without user intervention, a second threshold value of the aspect using the aspect model trained using machine learning based on the third value of the aspect;
initiating a search query including the aspect;
repeating, in a background, one or more searches automatically and without user intervention using the search query until a determination that a triggering event has occurred, the triggering event based on a comparison of a value of the aspect of a search reslut of the repeated one or more searches and the second threshold value of the aspect; and
outputting, by the artificial assistant system, a notification responsive to the determination that the triggering event has occurred.

12. The one or more non-transitory computer readable storage media as described in claim 11, wherein the aspect is a non-price aspect, the non-price aspect including color, size, pattern, style, or material.

13. The one or more non-transitory computer readable storage media as described in claim 12, wherein the non-price aspect is identified from a digital image output by the artificial assistant system as part of the initial natural language conversations.

14. The one or more non-transitory computer readable storage media as described in claim 11, wherein the search query including the aspect further includes a different product or service.

15. The one or more non-transitory computer readable storage medias as described in claim 11, wherein the aspect is a price and the second threshold value of the aspect is a threshold change in the price.

* * * * *